(12) United States Patent  (10) Patent No.: US 7,840,124 B2
Olwin  (45) Date of Patent: Nov. 23, 2010

(54) OPTICAL TABLE FOR AIRCRAFT AND METHOD THEREFOR

(75) Inventor: Steve R. Olwin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 194 days.

(21) Appl. No.: 12/191,731

(22) Filed: Aug. 14, 2008

(65) Prior Publication Data

US 2009/0296250 A1 Dec. 3, 2009

Related U.S. Application Data

(60) Provisional application No. 61/058,537, filed on Jun. 3, 2008.

(51) Int. Cl.
*G03B 39/00* (2006.01)
*G03B 17/00* (2006.01)

(52) U.S. Cl. .......................... 396/12; 396/427
(58) Field of Classification Search ................ 396/12, 396/13, 427; 348/144; 248/636, 638
See application file for complete search history.

(56) References Cited

U.S. PATENT DOCUMENTS

| | | | |
|---|---|---|---|
| 4,402,482 A | 9/1983 | Harbaugh et al. | |
| 4,690,507 A | 9/1987 | Zimmermann | |
| 4,863,275 A | 9/1989 | Cormack et al. | |
| 4,905,519 A | 3/1990 | Makowski | |
| 5,249,144 A | 9/1993 | Falk | |
| 5,285,995 A | 2/1994 | Gonzalez et al. | |
| 5,962,104 A * | 10/1999 | Gertel et al. | 428/116 |
| 6,460,997 B1 | 10/2002 | Frey et al. | |
| 6,497,483 B2 | 12/2002 | Frey et al. | |
| 6,745,981 B1 * | 6/2004 | Rainer et al. | 244/118.1 |
| 6,798,812 B2 | 9/2004 | Rylov et al. | |
| 7,064,908 B2 | 6/2006 | Cipra | |
| 7,320,455 B2 * | 1/2008 | Ryaboy et al. | 248/638 |
| 7,520,467 B2 * | 4/2009 | Gioffre et al. | 244/118.1 |
| 7,614,334 B2 * | 11/2009 | Bellino et al. | 89/1.51 |
| 2008/0149763 A1 * | 6/2008 | Wakayama et al. | 244/118.1 |

* cited by examiner

*Primary Examiner*—Rodney E Fuller
(74) *Attorney, Agent, or Firm*—Weiss & Moy, P.C.

(57) ABSTRACT

An optical bench for mounting in an interior compartment of a flight pod has a substantially flat top surface. A bottom surface is attached to the top surface. The bottom surface is shaped to conform to a shape of the interior compartment of the flight pod. A core material is placed between the top surface and the bottom surface.

20 Claims, 6 Drawing Sheets

OPTICAL TABLE FOR AIRCRAFT AND METHOD THEREFOR

RELATED APPLICATIONS

The present application is related to U.S. Provisional Application Ser. No. 61/058,537, filed Jun. 3, 2008, in the name of the same inventor, and entitled, "FLIGHT POD MOUNTED OPTICAL BENCH", hereby incorporated by reference. The present patent application claims the benefit under 35 U.S.C. §119(e).

BACKGROUND

Embodiments of this disclosure relate generally to an optical table or optical bench, and more particularly, to optical tables which may be secured within a flight pod mounted to an aircraft and have the ability to meet strict line of sight stability requirements.

An optical table is a device used to support optical elements (i.e. optics) for optical experiments. In general, an optical table will consist of a long rigid member having a flat top and flat bottom surface made of steel or some other sturdy metal. A core material may be positioned between the top and bottom surfaces. The top surface of the optical table may have a grid of threaded holes which may be used to mount the components of the optical experiment. Alternatively, the components may be attached to the top surface by magnets.

In order to perform the optical experiments, each component placed on the optical table must be precisely aligned. Any small vibrations, movement or strain in the optical table on which the components are set up might lead to inaccurate results or complete failure of the experiment. Therefore, an extremely sturdy optical table which neither vibrates nor flexes, even under heavy loads, is generally required.

The requirement of precision alignment of components on the optical table becomes a bigger problem when the optical table is positioned on a mobile platform such as an aircraft. In order to meet stringent line of sight stability requirements, large optical benches are generally used. However, aircraft generally have limited space. Space requirements are even further restricted when optical benches are placed in flight pods which are externally mounted on the wings of the aircraft. The restricted geometry within the flight pod allows only for long, thin optical benches where stiffness is low. The long, thin optical benches tend to flex under heavy loads thereby causing alignment issues.

Therefore, it would be desirable to provide a system and method that overcomes the above problems. The system and method will be able to be integrated into the restricted space of a mobile platform with the ability to meet the stringent line of sight stability requirements.

SUMMARY

An optical bench for mounting in an interior compartment of a flight pod has a substantially flat top surface. A bottom surface is attached to the top surface. The bottom surface is shaped to conform to a shape of the interior compartment of the flight pod. A core material is placed between the top surface and the bottom surface An optical pod has a pod for attaching to an exterior of an aircraft. The pod has an interior compartment. An optical table is placed in the interior compartment. The optical table is shaped to conform to a shape of the interior compartment.

An optical bench for mounting in an interior compartment of a flight pod has a substantially flat top surface. A bottom surface is attached to the top surface. The bottom surface is semi-circular in shaped to conform to a shape of the interior compartment of the flight pod. A core material is placed between the top surface and the bottom surface. A cover is removably attached to a side section of the bottom surface. The cover is semi-circular in shaped to conform to the shape of the interior compartment of the flight pod. At least one heater element is attached to the cover. A plurality of clamping devices is coupled to an exterior side of the bottom surface for attaching the optical bench to the interior compartment of the flight pod. An isolator is attached to each of the plurality of clamping devices.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
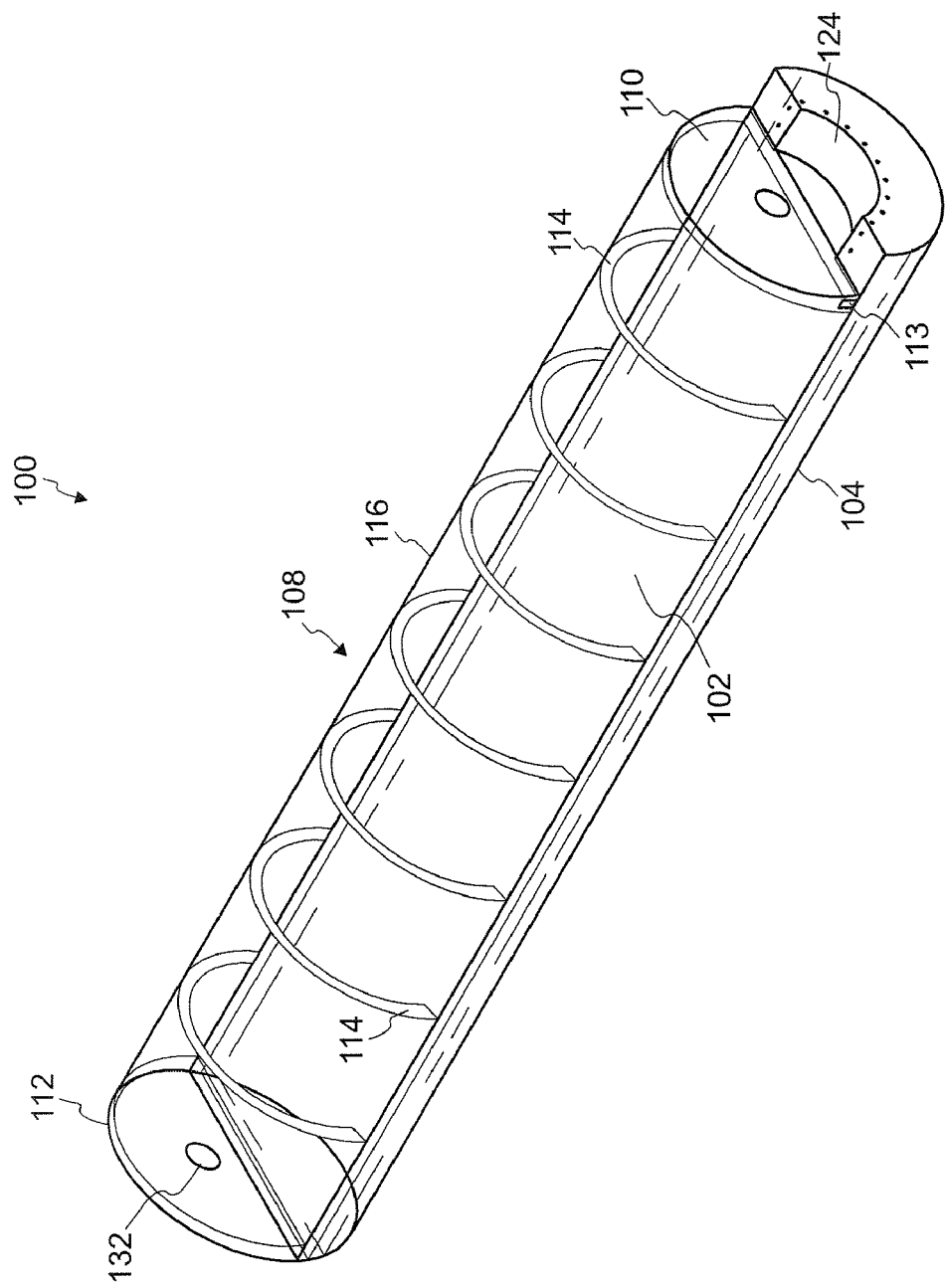
FIG. 1 is an elevated perspective view of an optical bench for mounting on a moving platform.

With reference now to FIGS. 1-6, an optical bench 100 is shown. The optical bench 100 may be integrated into a restricted space flight pod 200 (FIGS. 9-10) with the ability to meet stringent line of sight stability requirements. The optical bench 100 may incorporate a top surface 102 and a bottom surface 104. The top surface 102 is substantially flat and is used for attaching optical components 106 thereupon. In accordance with one embodiment, the top surface 102 may be formed of steel or other metal material, a composite material or the like. While a metal material may be less costly, a composite material would allow the optical bench 100 to be lighter in weight as weight may be a high priority as the optical bench 100 is being integrated into a restricted space flight pod 200.

Figure 8:
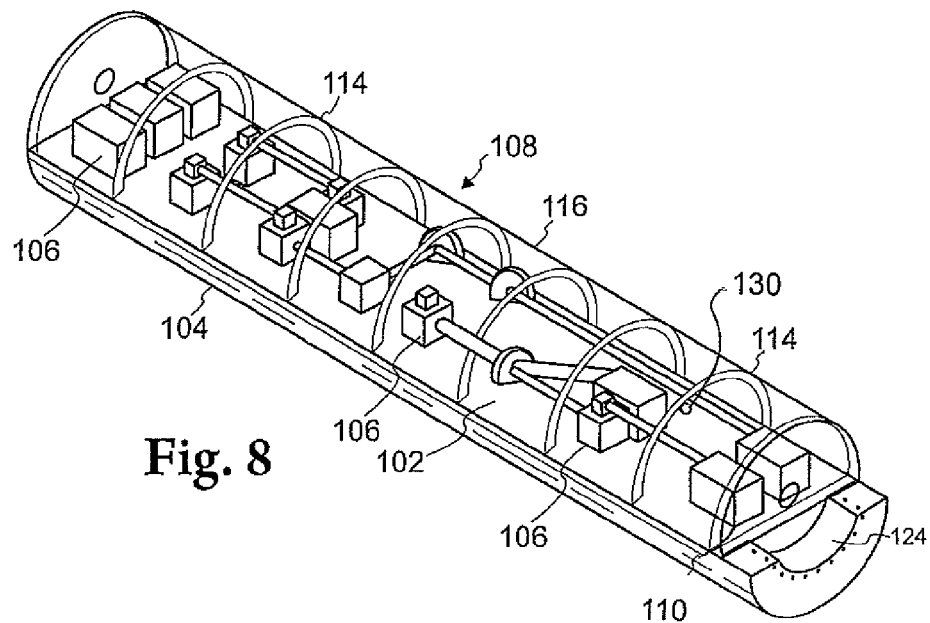
FIG. 8 is an elevated perspective view of the optical bench of FIG. 1 showing the optical components mounted on the optical bench.

The top surface 102 may have a grid formed thereon. The grid will be used to properly align the components 106 (FIG. 8). In accordance with one embodiment, the grid may be formed of a plurality of holes formed in the top surface 102. The holes may be used to mount the components 106 for the optical experiment to be performed on the optical bench 100. The holes may be threaded to secure the components 106 to the top surface 102. Alternatively, the components 106 may be attached to the top surface 102 by magnets or by other connection devices.

A bottom surface 104 may be attached to the top surface 102. The bottom surface 104 is generally formed of the same material as the top surface 102. Thus, in accordance with one embodiment, steel or a similar metal material may be used. The bottom surface 104 may be sized and shaped so as to conform to the size and shape of a bottom section of an interior space formed in the flight pod 200. By conforming to the bottom section of the interior space formed in the flight pod 200, the optical bench 100 will takes advantage of the available section within the interior of the flight pod 200 for structural stiffness. By conforming to the bottom section of the interior space formed in the flight pod 200, the diving board effect or flexing of the conventional long, thin optical bench is removed. This increases the overall stiffness of the optical bench 100.

In the embodiment depicted in the Figures, the bottom surface 104 is semi-circular in shape. The semi-circular shape of the bottom surface 104 conforms to the shape of the interior compartment of the fight pod 200. However, this is shown as one example and should not be seen as to limit the scope.

A core material 109 is generally placed between the top surface 102 and a bottom surface 104. The core material 109 is used to increase the stiffness of the optical bench 100. The core material 109 reduces the ability of the top surface 102 to flex under a load. In accordance with one embodiment, the core material 109 is a honeycomb structure 109A. The honeycomb structure 109A may increase the stiffness and reduce the weight of the optical bench 100.

The honeycomb structure 109A will have a plurality of honeycomb shaped tubes 109B. The honeycomb shaped tubes 109B are hollow thereby reducing the weight of the optical bench 100. The honeycomb shaped tubes 109B are coupled together to form the honeycomb structure 109A. Each honeycomb shaped tubes 109B will have a plurality of arm members 109C. When one or more arm members 109C of a honeycomb shaped tube 109B is broken, the surrounding arm members 109C of adjacent honeycomb shaped tubes 109B can carry the load due to the honeycomb structure 109A ability to transfer forces.

The optical bench 100 may have a cover 108. The cover 108 may be used to enclose the top surface 102 of the optical bench 100 and to provide additional stiffness to the optical bench 100 as the cover 108 is structural in nature. In the embodiment depicted in the Figures, the cover 108 is sized and shaped to conform to a top area within the interior space formed within the flight pod 200. By conforming to the shape of the top area in the interior of the flight pod 200, takes advantage of the available section within the interior of the flight pod 200 for structural stiffness. The cover 108 may further provide for the ability to environmentally control the optical components 106 positioned on the optical bench 100 since the cover 108 may enclose the top surface 102. In the embodiment depicted in the Figures, the cover 108 is semi-circular in shape. However, this is only shown as an example as the interior of the flight pod 200 may be of different shapes/sizes.

In accordance with one embodiment, the cover 108 may have a forward bulkhead 110 and an aft bulkhead 112. The forward and aft bulkheads 110 and 112 may be used to enclose the forward and aft sections of the top surface 102. The forward and aft bulkheads 110 and 112 may be removably attached to a side section of the bottom surface 104 of the optical table 100. Connectors 113 may be used to removably attach the bulkheads 110 and 112 to the side section of the bottom surface 104. The connectors 113 may be screws, latches, or other types of removable connectors. The listing of the above is given as an example and should not be seen as to limit the scope.

A plurality of support members 114 are positioned between the forward bulkhead 110 and the aft bulkhead 112 and may be removably attached to a side section of the bottom surface 104. The support members 114 are used as "stiffeners" for a skin member 116 that is placed over the support members 114. Connectors 113 may be used to attach the support members 114 to the side section of the bottom surface 104. The support members 114 provide stiffness to the cover 108 so the cover 108 can maintains its shape and increase the stiffness of the optical bench 100. In the Figures, the forward and aft bulkheads 110 and the plurality of support members 114 are semi-circular in shape. However, this is only shown an example.

A skin member 116 may be placed over and secured to the forward and aft bulkheads 110 and the plurality of support members 114. Rivets 115 or other types of permanent connectors may be used to secure the skin member 116 to the forward and aft bulkheads 110 and the plurality of support members 114. Alternatively, in accordance with one embodiment, the skin members 116 are integral to the support members 114. Thus the skin members 116 may be welded to the support members 114 when the cover 108 is a metal cover. If the cover 108 is a composite, the skin members 116 may be integrally taped and cured to the cover 108. Once secured, the skin member 116 forms an enclosure over the top surface 102 that maintains its shape under load and does not deform thereby maintaining structural integrity. Also, by enclosing the top surface, the skin member 116 in conjunction with the forward and aft bulkheads 110 and 112 may provide for the ability to environmentally control the optical components positioned on the optical bench 100. The skin material 116 may be formed of a light weight metal such as aluminum, a composite material or the like. The listing is given as an example and should not be seen as to limit the scope.

Figure 7:
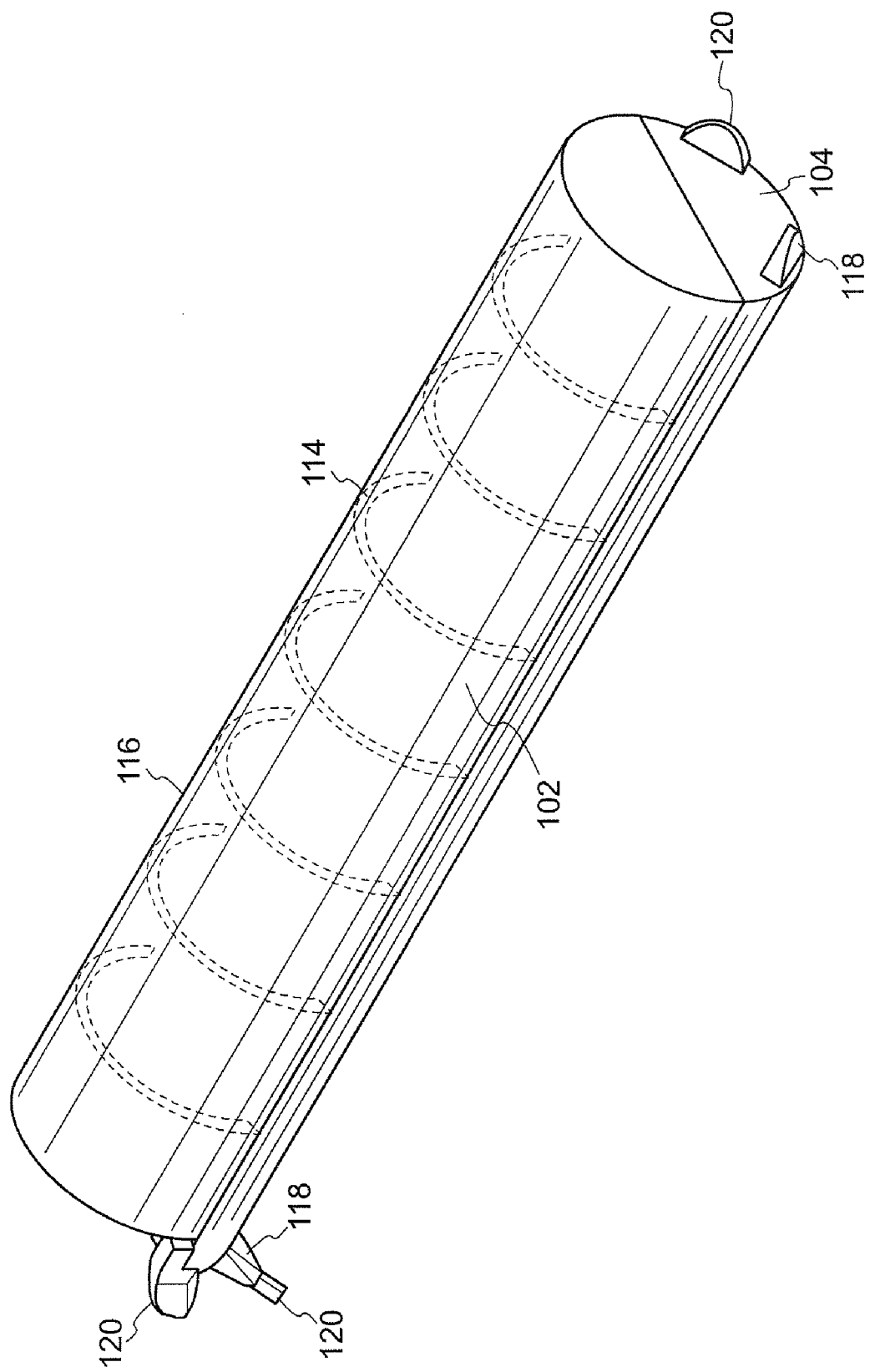
FIG. 7 is an elevated perspective view of the optical bench of FIG. 1 having mounting devices.

Referring now to FIG. 7, the optical bench 100 may have one or more connectors 118. The connectors 118 may be used to further secure the optical bench 100 to the interior of the flight pod 200. The connectors 118 when attached prevent the optical bench 100 from moving within the interior of the flight pod 200. The connectors 118 may be brackets, clamps, or other types of removable connectors. The listing is given as an example and should not be seen as to limit the scope. In accordance with one embodiment, the connectors 118 may be attached to an exterior section of the bottom surface 104. However, this is just shown as an example. The connectors 118 may be attached to other areas of the optical table 200 without departing from the spirit and scope.

In accordance with one embodiment, isolators 120 are attached to the connectors 118. As shown in FIG. 7, the isolators 120 are attached between the connectors 118 and the pod structure 200. The isolators 120 are used to isolate the optical bench 100 from higher frequency dynamics induced from aerodynamics or aircraft induced noise and/or vibrations. The isolators 120 may further prevent the optical bench 100 from being affected by loads induced from the relative motion between the connectors 118.

Figure 2:
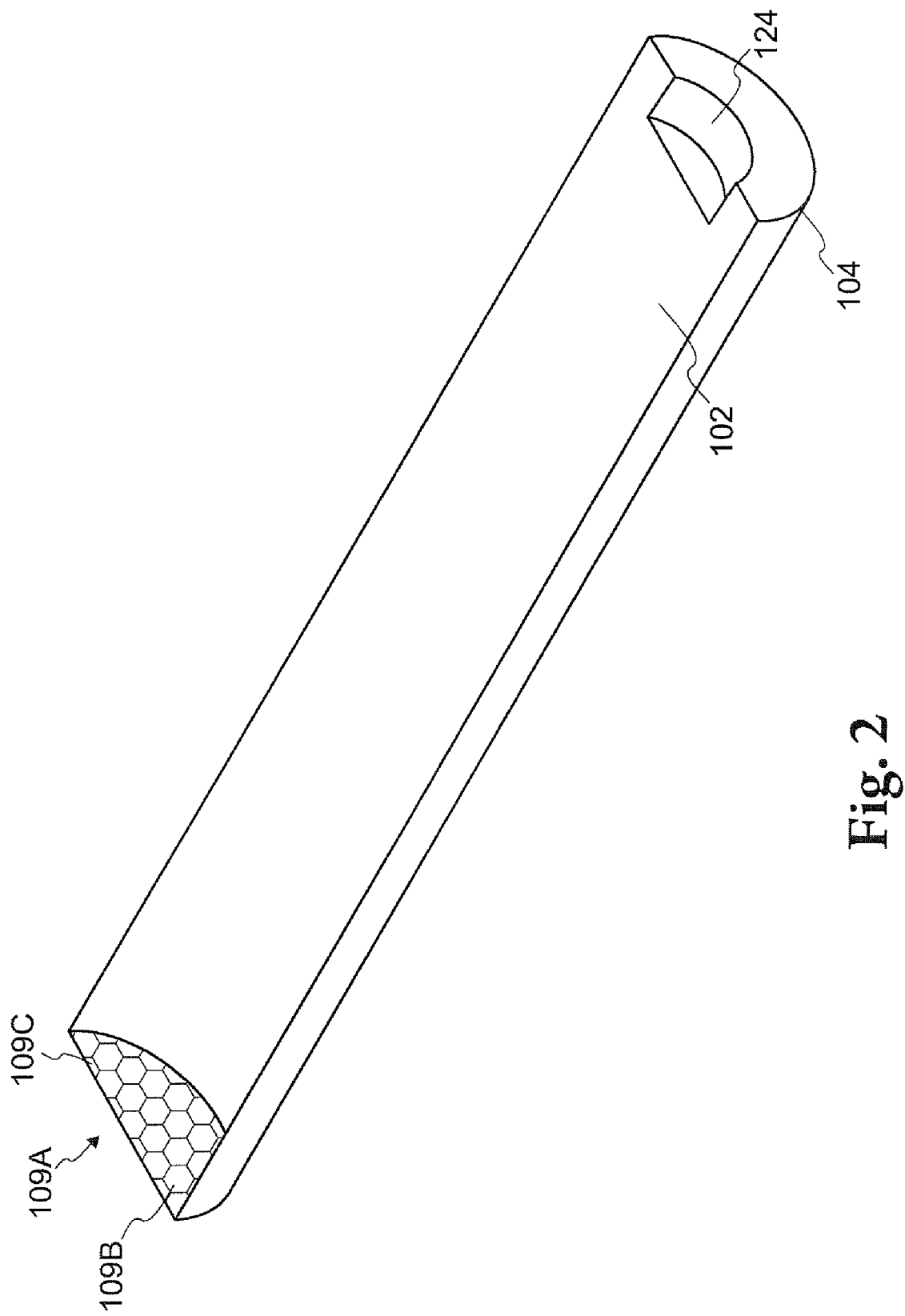
FIG. 2 is an elevated perspective view of the optical bench depicted in FIG. 1 with the cover removed.
Figure 3:
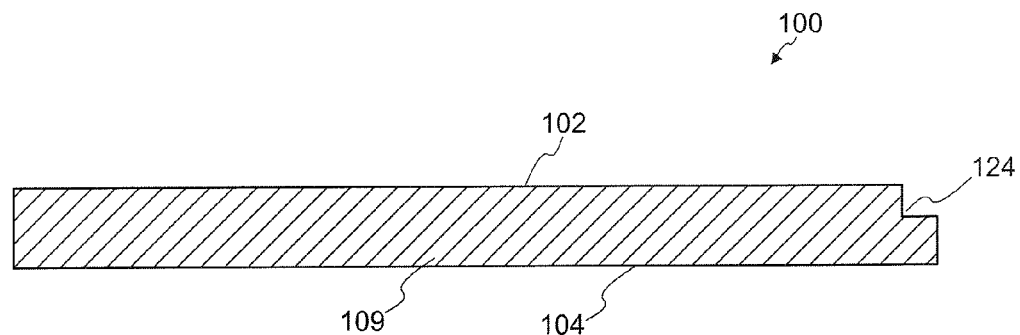
FIG. 3 is a cross-section view of the optical bench of FIG. 1 with the cover removed.
Figure 4:
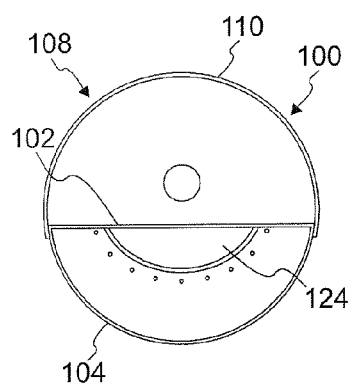
FIG. 4 is a front view of the optical bench depicted in FIG. 1.
Figure 5:
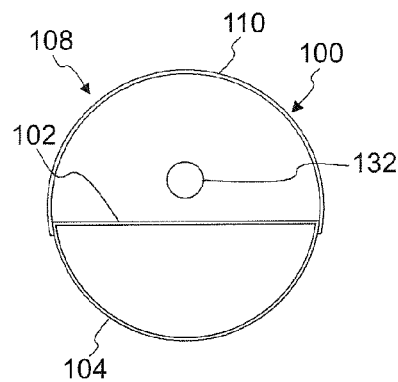
FIG. 5 is a rear view of the optical bench depicted in FIG. 1.
Figure 6:
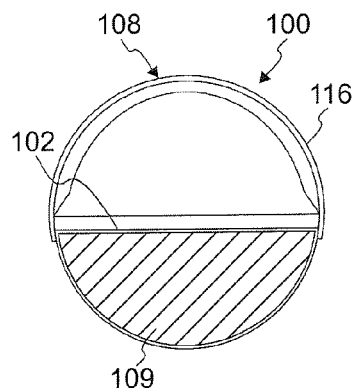
FIG. 6 is a cross-section view of the optical bench taken along a central area of the optical bench depicted in FIG. 1.

Referring now to FIGS. 1, 2 and 8, a beam director 122 may be mounted to the forward section of the optical bench 100 and secured to the flight pod 200. The beam director 122 directs (points) the beam in azimuth and elevation and expands the beam. In the embodiment depicted in the Figures, the beam director 122 mounts to the forward end of the optical bench 100 and forms an environmental seal with the forward bulkhead 110.

A notch 124 may be formed in the front section of the optical table 100. The notch 124 is used to support and secure the beam director 122 to the forward end of the optical bench 100. The notch 124 allows attachment of the beam director 122 to the top and front surfaces of the optical table 100 as the beam director azimuth gimbal is cylindrical in shape and "sits" in the notch 124. In the embodiment shown, the notch 124 is semi-circular in shape. The notch 124 is formed so that a portion of the core material 109 in the front top section of the bottom surface 104 is removed. The section of the top surface 104 above where the notch 124 is formed in the bottom surface 104 is also removed. The remaining core material 109 that is exposed is enclosed with the same material as the top and bottom surfaces 102 and 104 respectively.

Figure 9:
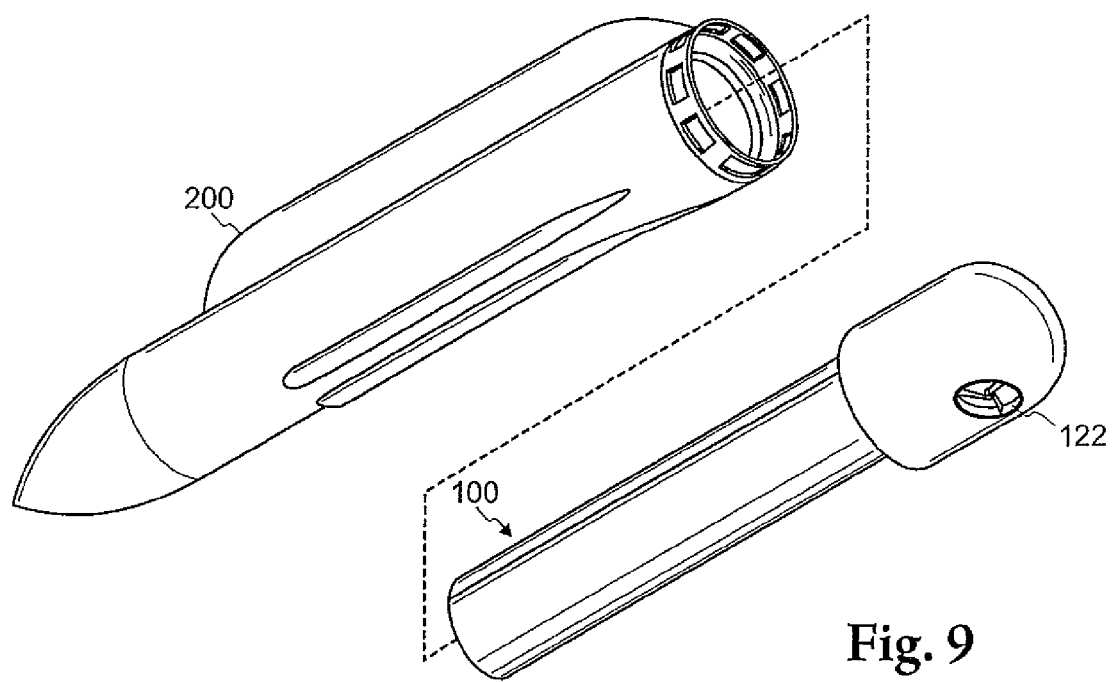
FIG. 9 is an exploded view of the optical bench mounted within the aircraft pod depicted in FIG. 8.
Figure 10:
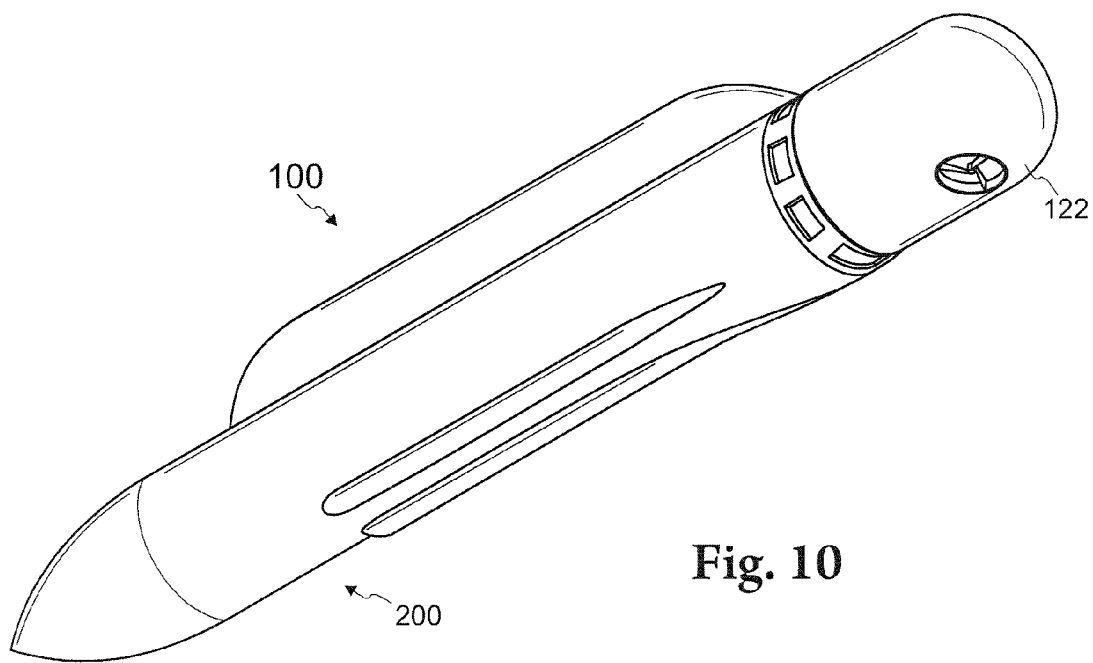
FIG. 10 is an elevated perspective view of the optical bench mounted within an aircraft pod.

Referring now to FIG. 9, the optical bench 100 may be inserted into the flight pod 200. The optical bench 100 is positioned within the interior of the flight pod 200. The cylindrical shape of the lower surface 102 and cover 108 will conform to the shape of the interior of the flight pod 200. The connectors 118 are then used to secure the optical bench 100 to the interior of the flight pod 200. The optical bench 100 is positioned so that the external shroud 128 of the beam director 122 forms a forward pod fairing and interfaces to the external pod skin 126.

Heaters 130 may be attached to the cover 108 of the flight pod 100. The heaters 130 are used to maintain a desired environment for the components positioned on the optical bench 100 by controlling the temperature of the optical table 100.

In operation, purge gas may be injected into an opening formed 132 in the aft bulkhead 112 from a pressurized bottle either aft of the optical bench 100 in the flight pod 200 or in the aircraft. In general, a tubing may used to inject the purge gas from the pressurized bottle into the opening 132 in the aft bulkhead 112. Purge air or gas is then exhausted out through the shroud 128 of the beam director 122 which forms a fairing for the front end of the flight pod 200.

The optical table 100 takes advantage of restricted cylindrical flight pod envelopes. The optical table 100 incorporates a lower surface 104 sized and shaped to conform to the interior of the flight pod 200 with a flat top surface 102 for optical component integration. Top and bottom surfaces 102 and 104 are separated by a core material 109 for increased stability. A cylindrical, stiffened cover 108 closes out the top surface 102 of the optical bench 100 providing additional stiffness and, along with forward and aft bulkheads 110 and 112, provides the ability to environmentally control optical components with attached heaters 130 and external purge system.

While embodiments of the disclosure have been described in terms of various specific embodiments, those skilled in the art will recognize that the embodiments of the disclosure can be practiced with modifications within the spirit and scope of the claims.

What is claimed is:

1. An optical bench for mounting in an interior compartment of a flight pod, comprising:
    a substantially flat top surface;
    a bottom surface attached to the top surface, the bottom surface shaped to conform to a shape of the interior compartment of the flight pod;
    a core material placed between the top surface and the bottom surface; and
    a plurality of attachment devices coupled to an exterior side of the bottom surface for attaching the optical bench to the interior compartment of the flight pod.

2. The bench of claim 1, further comprising a cover removably attached to a side section of the bottom surface.

3. The bench of claim 2, wherein the cover is shaped to conform to the shape of the interior compartment of the flight pod.

4. The bench of claim 2, further comprising heater elements attached to the cover.

5. The bench of claim 2, wherein the cover comprises:
    a forward bulkhead;
    an aft bulkhead;
    a plurality of support members positioned between the forward bulkhead and the aft bulkhead; and
    a skin member placed over and attached to the forward bulkhead, the aft bulkhead, and the plurality of support members.

6. The bench of claim 1, wherein the plurality of attachment devices is a plurality of clamping devices.

7. The bench of claim 6, further comprising an isolator attached to each of the plurality of clamping devices.

8. The bench of claim 6, further comprising a notch formed in a front section of the top surface and bottom surface, the notch used to support a beam director attached to the optical bench.

9. The bench of claim 6, further comprising an opening formed in an aft section of the cover for injecting a purge gas.

10. An optical pod comprising:
    a pod for attaching to an exterior of an aircraft, the pod having an interior compartment;
    an optical table placed in the interior compartment, the optical table shaped to conform to a shape of the interior compartment; and
    a plurality of clamping devices coupled to an exterior side of a bottom surface of the optical table for attaching the optical table to the interior compartment of the flight pod.

11. The pod of claim 10 further comprising:
    optical components attached to the optical table; and
    a beam director attached to the optical table and to the pod.

12. The pod of claim 11, further comprising a notch formed in a front section of the optical table, the notch used to support the beam director.

13. The pod of claim 10, wherein the optical table comprising:
    a substantially flat top surface;
    a bottom surface attached to the top surface, the bottom surface shaped to conform to the shape of a bottom section of the interior compartment of the pod; and
    a core material placed between the top surface and the bottom surface.

14. The pod of claim 13, wherein the optical table comprising a cover removably attached to a side section of the bottom surface, wherein the cover is shaped to conform to the shape of a top section of the interior compartment of the pod.

15. The pod of claim 14, further comprising heater elements attached to the cover.

16. The pod of claim 14, wherein the cover comprises:
    a forward bulkhead removably attached to a side section of the bottom surface;
    an aft bulkhead removably attached to a side section of the bottom surface;
    a plurality of support members removably attached to a side section of the bottom surface and positioned between the forward bulkhead and the aft bulkhead; and a skin member placed over and attached to the forward bulkhead, the aft bulkhead, and the plurality of support members.

17. The pod of claim 14, further comprising an opening formed in an aft section of the cover for injecting a purge gas.

18. The pod of claim 10, further comprising
an isolator attached to each of the plurality of clamping devices.

19. An optical bench for mounting in an interior compartment of a flight pod comprising:
a substantially flat top surface;
a bottom surface attached to the top surface, the bottom surface being semi-circular in shaped to conform to a shape of the interior compartment of the flight pod;
a core material placed between the top surface and the bottom surface;
a cover removably attached to a side section of the bottom surface, the cover being semi-circular in shaped to conform to the shape of the interior compartment of the flight pod;
at least one heater element attached to the cover;
a plurality of clamping devices coupled to an exterior side of the bottom surface for attaching the optical bench to the interior compartment of the flight pod; and
an isolator attached each of the plurality of clamping devices.

20. The bench of claim 19, wherein the cover comprises:
a forward bulkhead;
an aft bulkhead;
a plurality of support members positioned between the forward bulkhead and the aft bulkhead;
a skin member placed over and attached to the forward bulkhead, the aft bulkhead, and the plurality of support members;
a notch formed in a front section of the top surface and bottom surface, the notch used to support a beam director attached to the optical bench; and
an opening formed in an aft section of the cover for injecting a purge gas.

* * * * *